United States Patent
Shen et al.

(10) Patent No.: US 8,213,373 B2
(45) Date of Patent: Jul. 3, 2012

(54) SUPPORTING METHOD FOR REFER MESSAGE EXPANSION PARAMETER

(75) Inventors: Min Shen, Shenzhen (CN); Yiwen Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 466 days.

(21) Appl. No.: 12/597,124

(22) PCT Filed: Dec. 18, 2007

(86) PCT No.: PCT/CN2007/003646
§ 371 (c)(1),
(2), (4) Date: Oct. 22, 2009

(87) PCT Pub. No.: WO2008/131620
PCT Pub. Date: Nov. 6, 2008

(65) Prior Publication Data
US 2010/0128718 A1 May 27, 2010

(30) Foreign Application Priority Data
Apr. 26, 2007 (CN) .......................... 2007 1 0097529

(51) Int. Cl.
*H04W 4/00* (2009.01)
*H04J 3/16* (2006.01)
(52) U.S. Cl. ........................................ 370/329; 370/465
(58) Field of Classification Search ........................ None
See application file for complete search history.

(56) References Cited

U.S. PATENT DOCUMENTS

| 2004/0008669 | A1 | 1/2004 | Bos et al. |
| 2009/0047915 | A1* | 2/2009 | Albertsson ................... 455/90.2 |

FOREIGN PATENT DOCUMENTS

| CN | 1467978 A | 1/2004 |
| CN | 1863203 A | 11/2006 |
| CN | 1941761 A | 4/2007 |
| WO | WO0165881 A1 | 9/2001 |

* cited by examiner

*Primary Examiner* — John Blanton
(74) *Attorney, Agent, or Firm* — Woodcock Washburn LLP

(57) ABSTRACT

The present invention discloses a method for supporting extended parameter(s) in a REFER message, applied in a system comprising a parameter proxy server that can receive and forward the REFER message; upon receiving the REFER message including the extended parameter(s), the parameter proxy server performing the following processing: storing said extended parameter(s); sending the REFER message to the indicated party of the message; upon receiving a third party message sent by said indicated party and indicated by the method parameter in the REFER message, adding the extended parameter(s) stored into the third party message; sending the third party message to said third party. With the present invention, those IMS intelligent terminals that do not support the extended parameter(s) in the REFER message can more fully utilize the REFER message to use the abundant services provided by NGN.

8 Claims, 4 Drawing Sheets

SUPPORTING METHOD FOR REFER MESSAGE EXPANSION PARAMETER

TECHNICAL FIELD

The present invention relates to the field of SIP (Session Initiation Protocol), and especially to a method for supporting extended parameters in the REFER message.

BACKGROUND OF THE INVENTION

In the Next Generation Network (NGN) with IP (Internet Protocol) Multimedia Sub-system (IMS) as the core, the Session Initiation Protocol (SIP) is adopted as the service control protocol, and all the communication services can be accomplished by cooperation between intelligent terminals of users and application servers (AS) in the network.

FIG. 1 is a schematic diagram of a typical service implementation framework in the Next Generation Network, in which the application server (possibly multiple, respectively used in different services) connects with the Service-Call Session Control Function (S-CSCF) of home networks of users through its interface. The SIP service control messages (identified by the dashed lines) between user terminals A and B will go through the respective application servers (possibly through different application servers depending on the types of user services), and the application servers can implement abundant services by processing the service control messages in various ways. User terminals A and B interchange and negotiate the media parameters supported by them utilizing service messages, so as to establish a media stream connection between them (identified by the solid line), and the media stream can be used to transfer data such as session voice packets.

REFER is a type of special message defined in the SIP protocol, whose function is as follows: a REFER message is sent to user A by user B, carrying main parameters including Refer-To (indicating a third party user C) and method (indicating a method); the user A initiates a certain operation request to user C based on this message (using the method indicated by the method parameter); the REFER message may be used in implementing services such as call transfer, a conference, completion of communications to busy subscriber, three-party session, and so on, and it is an important message in SIP.

The Refer-To parameter in the REFER message may also carry sub-parameters such as a sub-parameter of Replaces whose value is a dialogue identifier, used to indicate that the third party user C release a previous session indicated by this dialogue identifier after implementing a new operation (initiated by user A). The sub-parameter of Replaces can be used to implement some important services, and a typical example is one of the call transfer services: consultative transfer service.

Call transfer is a supplementary service in a communication system: after two users (user A and user B) establish a session in the communication system, one of them (taking user B for example) can request that the current session is transferred to a third party (user C), that is, a session is established between user A and user C and the session channel between user A and user B is disconnected. A common application scenario of this service is: a general manager's secretary (user B) receives all incoming calls (user A), inquires purposes of the other sides, and for those calls that need the general manager to answer in person, utilizes the call transfer service to transfer them to the general manager (user C).

There are two types of call transfer services: one type is consultative transfer, that is, user B first establishes a session with user C before the transfer (inquiring whether user C agrees to have a session with user A), and then initiates a transfer request so that a session is established between user A and user C, and meanwhile, respectively disconnects the session channel between user B and user A and that between user B and user C; the other type is blind transfer, that is, user B does not establish a session with user C first, but directly initiates a transfer request so that a session is established between user A and user C.

FIG. 2 shows a flow chart of signaling in the consultative transfer flow in the technical specification of TISPAN (Telecommunication and Internet converged Services and Protocol for Advanced Network) in the prior art. For simplification, in this chart, network equipments such as the Proxy-Call Session Control Function (P-CSCF) and Service-Call Session Control Function are omitted.

As shown in FIG. 2, user terminal-A (user A) and user terminal-B (user B) are in a session status (the session has an unique identifier D1, to be distinguished from other sessions in the network); the application server of user terminal-A (application server-A) and application server of user terminal-B (application server-B) both participate in this session process in order to provide supplementary services for the respective service objects; and then user terminal-B sets user terminal-A in a call hold status, and initiates and establishes a session channel with user terminal-C (this session has an unique session identifier D2), and the application server-B and application server of the user terminal-C (application server-C) both participate in this session process; and then user terminal-B sets user terminal-C in a call hold status; user terminal-B sends a TRANSFER request to user terminal-A, requesting that a new session is established between user terminal-A and user terminal-C and the session between user terminal-B and user terminal-C indicated by D2 is replaced (steps 1~3); after user terminal-A indicates that it accepts the request (steps 4~6), it sends an INVITE request to user terminal-C, requesting that the session indicated by D2 is replaced (steps 13~24); after the session between user terminal-A and user terminal-C is established, user terminal-C sends a HANG UP request to user terminal-B to disconnect the session between user terminal-B and user terminal-C indicated by D2; during the above process, before user terminal-A prepares to send the INVITE request to user terminal-C and when user terminal-A connects the session channel with user terminal-C, it utilizes notification messages to notify user terminal-B of relevant situations (respectively corresponding to steps 7~12, 31~36); finally, user terminal-B sends a HANG UP request to user terminal-A to disconnect the previous session channel between user terminal-A and user terminal-B (steps 37~42).

It should be noted that in the steps 1~3 of the above process, the TRANSFER request sent to user terminal-A by user terminal-B is implemented by utilizing the REFER message, with the Refer-To parameter in the REFER message carrying a sub-parameter of Replaces whose value is D2, and the method parameter in the REFER message adopting the INVITE request; whereas, in steps 13~24, the INVITE request sent to user terminal-C by user terminal-A also includes the parameter of Replaces (whose value is equal to the value of the sub-parameter of Replaces in the REFER request, that is, D2); After user terminal-C receives the INVITE request including the parameter of Replaces (step 16), it first establishes a session with user terminal-A according to a standard session establishment flow (steps 17~24), and then initiates a release process of the previous session (of which the dialogue identifier is D2) (steps 25~30).

From the above it can be seen that for the consultative transfer service, as the transferred party in the consultative transfer service and also the indicated party in the REFER message, the user terminal-A has to be able to process the parameter of Replaces, so that the entire consultative transfer flow can be correctly accomplished. However, the parameter of Replaces is an extended parameter in the SIP protocol, and some IMS intelligent terminals that emerged earlier do not support the parameter of Replaces. For these IMS intelligent terminals that do not support the parameter of Replaces, according to the prior art, they cannot be taken as the transferred party to implement a consultative transfer service.

To sum up, for those IMS intelligent terminals that do not support extended parameters in the REFER message (simply referred to as special intelligent terminals hereinafter), they will be greatly restricted in using the NGN services.

SUMMARY OF THE INVENTION

The technical problem to be solved by the present invention is to overcome the shortcomings in implementation of the REFER message in the prior art, and provide a method for supporting extended parameters in the REFER message, so that those IMS intelligent terminals that do not support the extended parameters in the REFER message can more fully utilize the REFER message to use the abundant services provided by NGN.

In order to solve the above problem, the present invention provides a method for supporting extended parameter(s) in a REFER message, applied in a system comprising a parameter proxy server that can receive and forward the REFER message; upon receiving the REFER message including the extended parameter(s), the parameter proxy server performing the following processing:

a) storing said extended parameter(s);

b) sending the REFER message to an indicated party of the message;

c) upon receiving a third party message sent by said indicated party and indicated by a method parameter in the REFER message, adding the extended parameter(s) stored into the third party message;

d) sending the third party message to said third party.

Furthermore, said parameter proxy server is an application server corresponding to said indicated party.

Furthermore, said parameter proxy server is an application server corresponding to an indicating party of said REFER message;

and the following steps are comprised between step a) and step b):

a1) storing an original value of a Refer-To parameter in the REFER message, and changing a value of the Refer-To parameter into an address information corresponding to said parameter proxy server;

and further, the following step is comprised between said step c) and step d):

c1) setting the target address of said third party message to the original value of said Refer-To parameter.

Furthermore, said extended parameter(s) is parameter(s) sent to said third party and processed by said third party.

Furthermore, said extended parameter is Replaces.

Furthermore, a value of said Replaces is a dialogue identifier of a session between the third party and an indicating party of said REFER message.

Furthermore, said third party message is INVITE.

Furthermore, the following step is comprised between said step a) and step b):

a2) Deleting the extended parameter(s) included in said REFER message.

By applying the method for supporting extended parameters in the REFER message in accordance with the present invention, the indicating party of the REFER message is enabled to send a REFER message including extended parameters that need to be received and processed by the third party of the REFER message to an IMS intelligent terminal that does not support the extended parameters in the REFER message, so that such IMS intelligent terminals can more fully utilize the REFER message to use the abundant services provided by NGN.

PREFERRED EMBODIMENTS OF THE PRESENT INVENTION

From the above description, it can be seen that since above-mentioned special intelligent terminals do not support the extended parameters in the REFER message, and can not be taken as the indicated party to process the extended parameters included in the REFER message, the extended parameters in the REFER message, which need to be forwarded to a third party of the REFER message to process, is processed in a manner of temporary storage and replacement.

For temporarily storing and replacing the extended parameters which need to be forwarded to a third party of the REFER message to process, it is required that when the indicated party of the REFER message receives the REFER message and sends a message corresponding to the method parameter to the third party indicated by the refer-to parameter in the REFER message, the application server corresponding to the indicating party of the REFER message is able to receive the message and perform the corresponding forwarding, that is, to preserve the application server corresponding to the indicating party in the SIP service control message path between the indicated party and the third party. This will be described below by taking the consultative transfer service for example.

Figure 1:
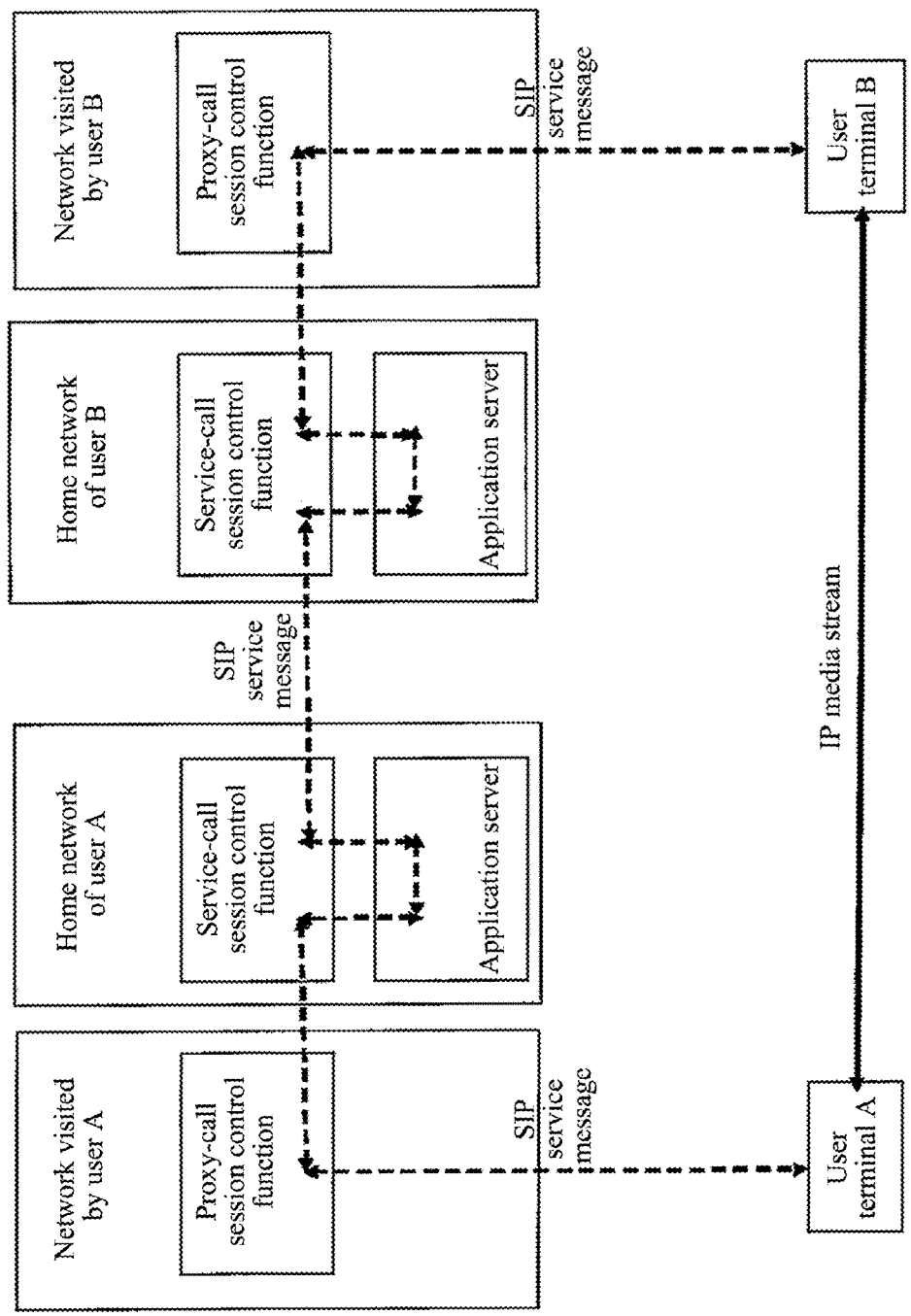
FIG. 1 is a schematic diagram of a typical service implementation framework in the Next Generation Network.
Figure 2:
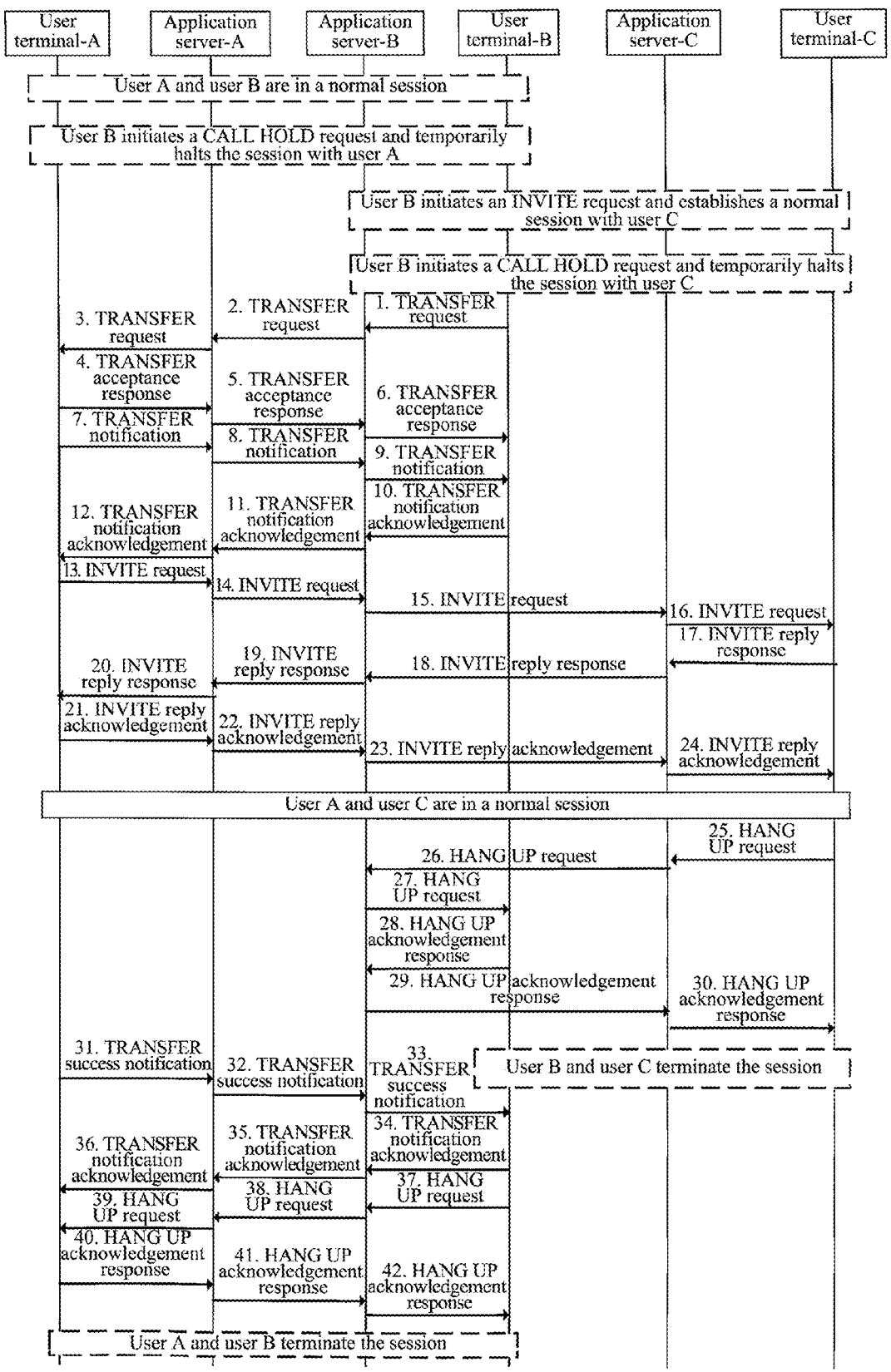
FIG. 2 is a flow chart of the consultative transfer service in the TISPAN technical specification.
Figure 3:
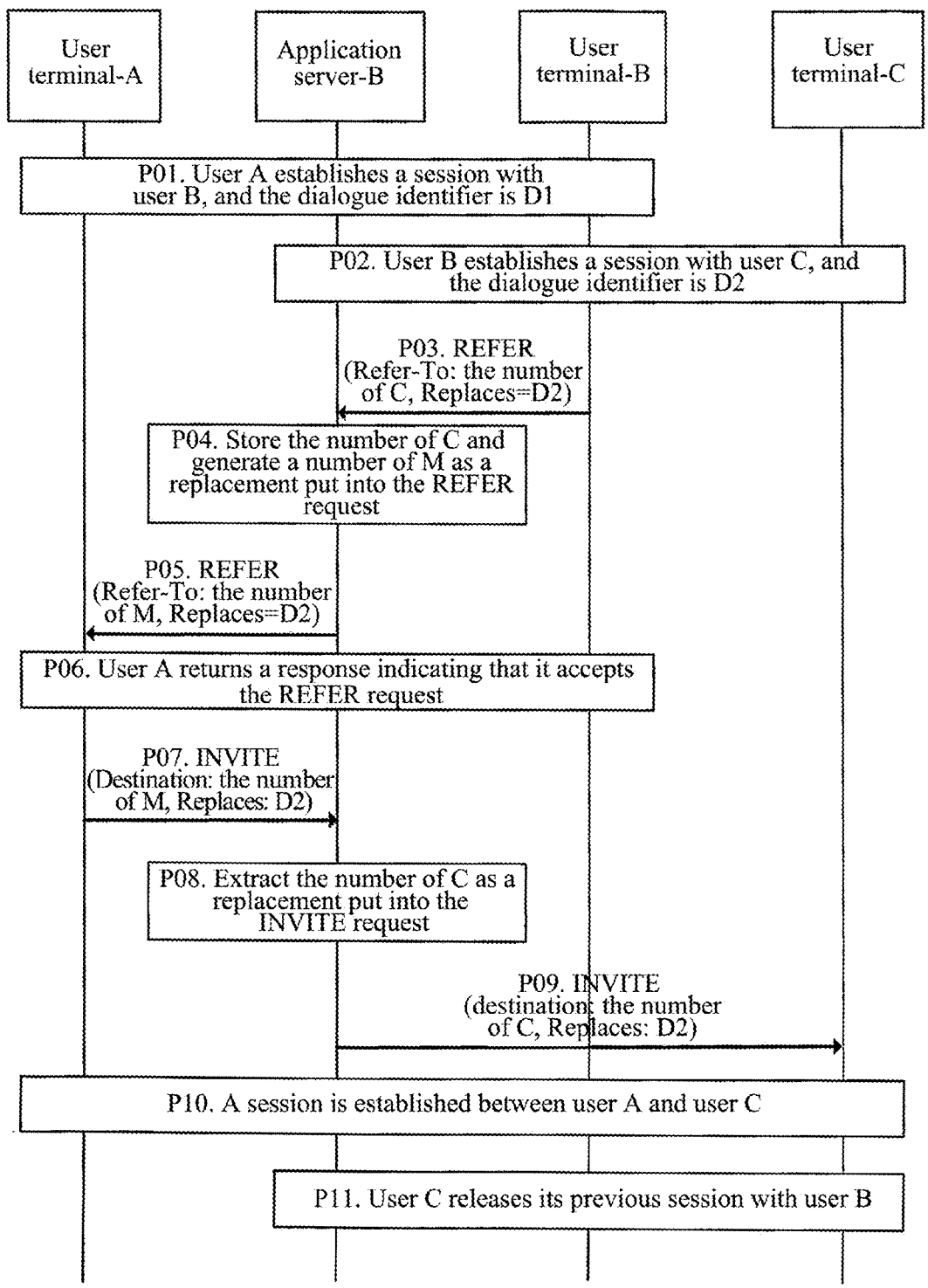
FIG. 3 is a flow chart of the method for implementing an improved consultative transfer service.

FIG. 3 is a flow chart of the method for implementing an improved consultative transfer service, and for simplification, network equipments such as application servers of user A and user C are omitted in FIG. 3. Wherein, user A is the transferred party of the consultative transfer service, user B is the transferring party of the consultative transfer service, and user C is the third party of the consultative transfer service, that is, user B transfers user A to user C during the session with user A. User A and user B both support the parameter of Replaces. Process of this service comprises the following procedures:

Step P01: a session is established between user A (user terminal-A) and user B (user terminal-B), and the dialogue identifier is D1;

Step P02: a session is established between user B (user terminal-B) and user C (user terminal-C), and the dialogue identifier is D2;

Step P03: user B sends a REFER request to user A, and in the REFER request, the value of the Refer-To parameter is set to the number of user C (the number of C), and the sub-parameter of Replaces is carried, whose value is D2;

Step P04: after the application server B receives the REFER request, it stores the number of user C and generates a number of M (the number can be routed to application server B) with which the value of the Refer-To parameter in the REFER request is replaced;

Step P05: application server B forwards the REFER request to user A, wherein the value of the Refer-To parameter is the number of M, and the sub-parameter of Replaces is carried, whose value is D2;

Step P06: user A returns a response to user B, indicating that it accepts the REFER request;

Step P07: user A sends an INVITE request of which the target address is the number of M (that is, application server B), with the parameter of Replaces carried, whose value is D2;

Step P08: after application server B receives the INVITE request, it extracts the number of C stored in procedure P04 with which the target address in the INVITE request is replaced;

Step P09: application server B forwards to user C the INVITE request, whose target address is the number of C, with the parameter of Replaces carried, whose value is D2;

Step P10: a session is established between user A and user C;

Step P11: user C releases its previous session with user B (of which the dialogue identifier is D2) according to the parameter of Replaces.

From the above flow it can be seen that in step P04, by replacing the value of the Refer-To parameter in the REFER request sent to user A with the number of M that can be routed to application server B, application server B is able to receive the INVITE request (the method indicated by the method parameter) sent to user C by user A, and perform the forwarding, that is, application server B is preserved in the SIP service control message path between user A and user C. On this basis, application server B can further process the extended parameter (such as Replaces) in the REFER request to implement a consultative transfer service in which a special intelligent terminal is taken as user A.

The present invention will be described in detail by taking the parameter of Replaces and the consultative transfer service for example in combination with the accompanying drawings.

Figure 4:
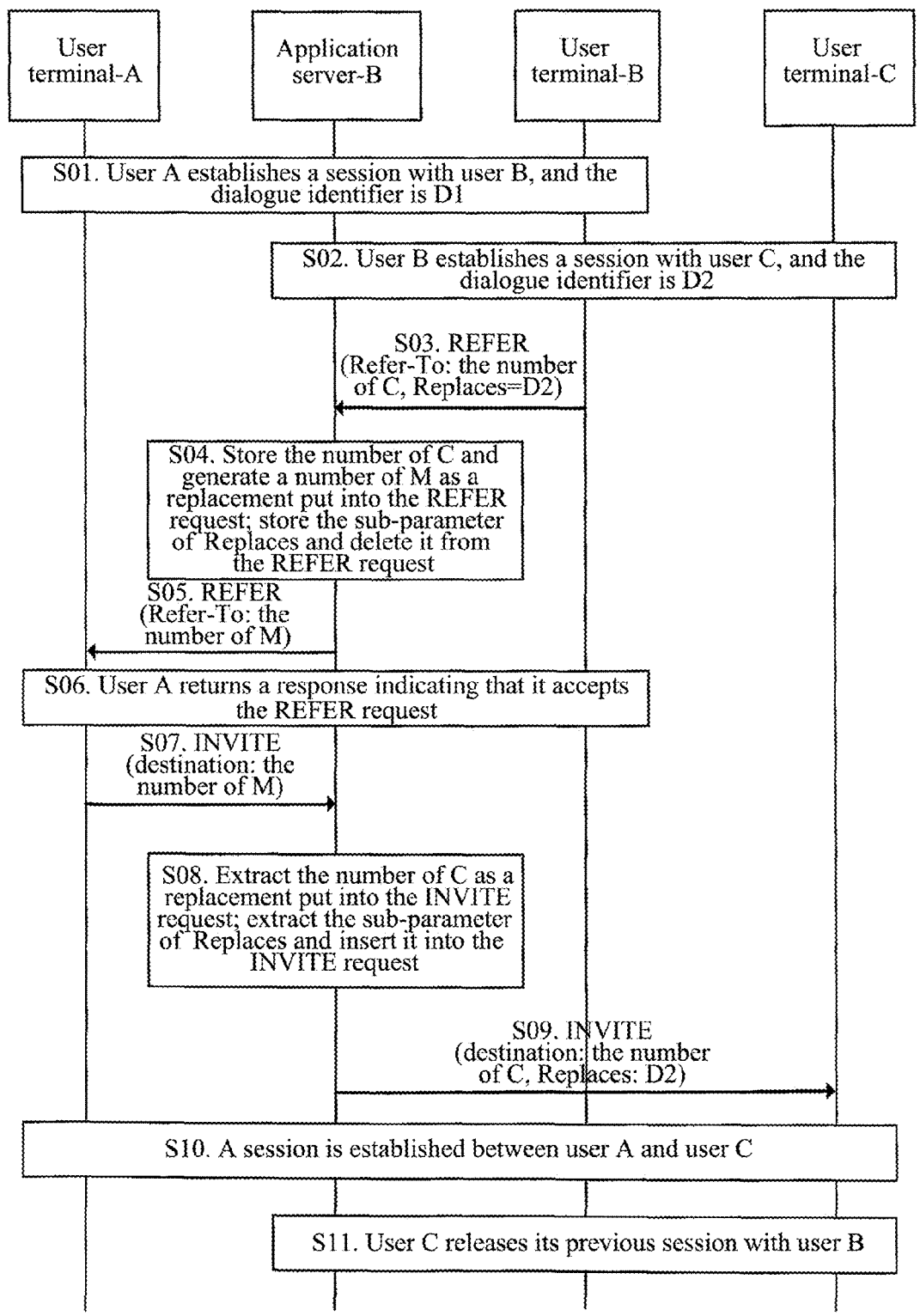
FIG. 4 is a flow chart of the consultative transfer service in which a special intelligent terminal is taken as the transferred party in accordance with an embodiment of the present invention.

FIG. 4 is a flow chart of the consultative transfer service in which a special intelligent terminal is taken as the transferred party in accordance with an embodiment of the present invention. Wherein, user A (user terminal-A) is the special intelligent terminal. As shown in FIG. 4, the flow comprises the following steps:

Step S01: a session is established between user A (user terminal-A) and user B (user terminal-B), and the dialogue identifier is D1;

Step S02: a session is established between user B (user terminal-B) and user C (user terminal-C), and the dialogue identifier is D2;

Step S03: user B sends a REFER request to user A, and in the REFER request, the value of the Refer-To parameter is set to the number of user C (the number of C) and the sub-parameter of Replaces is carried, whose value is D2;

Step S04: after application server B receives the REFER request from user B, it stores the value of the Refer-To parameter (the number of user C) and generates a number of M taken as the value of the Refer-To parameter in the REFER request; meanwhile, application server B also stores the sub-parameter of Replaces and may further delete this sub-parameter from the REFER request;

Step S05: application server B forwards the REFER request to user A, wherein the value of the Refer-To parameter is the number of M and the sub-parameter of Replaces is not carried;

Step S06: user A returns a response to user B, indicating that it accepts the REFER request;

Step S07: user A sends an INVITE request whose target address is the number of M (application server B);

Step S08: application server B receives the INVITE request, extracts the number of user C stored in step S04, and takes it as the destination in the INVITE request; meanwhile, the parameter of Replaces is inserted into the INVITE request, and the value of this Replaces parameter is equal to the value of the sub-parameter of Replaces stored in step S04 (D2);

Step S09: application server B forwards the INVITE request to user C, and the target address in the INVITE request is the number of user C, with the parameter of Replaces carried, whose value is D2;

Step S10: a session is established between user A and user C;

Step S11: user C releases its previous session with user B (of which the dialogue identifier is D2) according to the parameter of Replaces.

From the above flow it can be seen that user terminal-A does not have to process the parameter of Replaces and can be taken as the transferred party to participate in the implementation of the consultative transfer service.

In the above flow, with application server B temporarily storing and replacing the parameter of Replaces, user A needs not to process the parameter and can normally participate in the flow of consultative transfer service. In practice, the above processing of the parameter of Replaces may also be accomplished by application server A:

Since a REFER request sent to user A will first be sent to application server A, after receiving the REFER request, application server A may store the sub-parameter of Replaces and meanwhile delete this sub-parameter from the REFER request, and then forward the modified REFER request to user A; Likewise, an INVITE request sent to user C by user A will also pass through application server A, thereby, application server A can add the stored sub-parameter of Replaces into the INVITE request and forward the modified INVITE request to user A.

It should be noted that if application server A performing the above processing of sub-parameter of Replaces is adopted, there is no need to modify the parameter of Refer-To in the REFER request. Except this, the flow is generally the same as that in steps S01~S11.

Although the above flow describes the present invention by merely taking the example of the parameter of Replaces and consultative transfer service, the method of the present invention is not limited to this. For all kind of services in which the REFER message is used, the indicated party of the REFER message is a special intelligent terminal, and the extended parameters included in the REFER message need to be forwarded to the third party of the REFER message to process, they can be implemented with the method of the present invention.

Of course, the present invention may have a number of other embodiments, and without departing from the spirit and essence of the present invention, those skilled in the art can make all kinds of relevant modification or variation, but all such relevant modification and variation should belong to the scope of the appended claims of the present invention.

INDUSTRIAL APPLICABILITY

The present invention provides a method for supporting the extended parameters in the REFER message, which enables the indicating party of the REFER message to send a REFER message including extended parameters that need to be received and processed by the third party of the REFER message to an IMS intelligent terminal that does not support the extended parameters in the REFER message, so that such IMS intelligent terminals can more fully utilize the REFER message to use the abundant services provided by NGN.

What we claim is:

1. A method for supporting extended parameter(s) in a REFER message, applied in a system comprising a parameter proxy server that can receive and forward the REFER message; upon receiving the REFER message including the extended parameter(s), the parameter proxy server performing the following processing:
   a) storing said extended parameter(s);
   b) sending the REFER message to an indicated party of the message;
   c) upon receiving a third party message sent by said indicated party and indicated by a method parameter in the REFER message, adding the stored extended parameter(s) into the third party message; and
   d) sending the third party message to said third party.

2. A method of claim 1, wherein said parameter proxy server is an application server corresponding to said indicated party.

3. A method of claim 1, wherein said parameter proxy server is an application server corresponding to an indicating party of said REFER message;
   and the following steps are comprised between step a) and step b):
   a1) storing an original value of a Refer-To parameter in the REFER message, and changing a value of the Refer-To parameter into an address information corresponding to said parameter proxy server;
   and further, the following step is comprised between said step c) and step d):
   c1) setting a target address of said third party message to the original value of said Refer-To parameter.

4. A method of claim 1, wherein said extended parameter(s) is sent to said third party and processed by said third party.

5. A method of claim 4, wherein said extended parameter is Replaces.

6. A method of claim 5, wherein a value of said Replaces is a dialogue identifier of a session between the third party and an indicating party of said REFER message.

7. A method of claim 1, wherein said third party message is INVITE.

8. A method of claim 1, further comprising the following step between said step a) and step b):
   a2) deleting the extended parameter(s) included in said REFER message.

* * * * *